United States Patent [19]

Bajorek et al.

[11] Patent Number: 5,264,975
[45] Date of Patent: Nov. 23, 1993

[54] MAGNETIC DISK STORAGE DEVICE WITH THE BASE PROVIDED BY AN ELECTRONIC MODULE SUBSTRATE

[75] Inventors: Christopher H. Bajorek; Thomas W. Glaser; Richard Greenberg, all of Rochester; Jerr L. Neubauer, Stewartville; John R. Reidenbach, Rochester, all of Minn.

[73] Assignee: International Business Machines Corporation, Armonk, N.Y.

[21] Appl. No.: 914,234

[22] Filed: Jul. 13, 1992

Related U.S. Application Data

[63] Continuation of Ser. No. 746,044, Aug. 9, 1991, abandoned, which is a continuation of Ser. No. 409,495, Sep. 19, 1989, abandoned.

[51] Int. Cl.$^5$ .............................................. G11B 5/012
[52] U.S. Cl. .................................. 360/97.01; 360/903; 360/97.02; 360/98.02
[58] Field of Search ............... 360/92.02, 97.01, 97.03, 360/98.01, 98.02, 98.07, 99.08, 137, 900, 903; 29/832; 357/80

[56] References Cited

U.S. PATENT DOCUMENTS

| | | | |
|---|---|---|---|
| 4,639,863 | 1/1987 | Harrison et al. | 360/97.01 X |
| 4,669,009 | 5/1987 | Naoi et al. | 360/106 X |
| 4,810,048 | 3/1989 | Asano et al. | 360/137 X |
| 4,825,316 | 4/1988 | Kishi et al. | 360/97.02 |
| 5,025,335 | 6/1991 | Stafansky | 360/97.01 |

FOREIGN PATENT DOCUMENTS

| | | |
|---|---|---|
| 0204299 | 12/1986 | European Pat. Off. |
| 0298748 | 1/1989 | European Pat. Off. ......... 360/97.01 |
| 0270093 | 11/1987 | Japan ............................... 360/98.01 |
| 0127482 | 5/1988 | Japan ............................... 360/98.01 |

OTHER PUBLICATIONS

Kaiser et al., A Fabrication Technique for Multilayer Ceramic Modules, Solid State Technology May 1972 pp. 35-39.
Clark et al., IBM Multichip Multilayer Ceramic Modules for LSI Chips—Design for Performance and Density, IEEE vol CHMT-3 No. 1 Mar. 1980.
Blodgett, Jr. A Multilayer Ceramic Multichip Module, IEEE CHMT-3 No. 4 Dec. 1980.
Clemens, Eelctronic Engineering Times, Feb. 25, 1985 Issue 318, The Drive for Smaller, Cheaper Storage.
Patent Abstract of Japan, #01112586, "Packaging Structure for Small-Sized Disk Driver", Tonozuka Kazutoshi, IPC G11B33/12 G11B25/04, Oct. 8, 1989.
Patent Abstract of Japan "Video Tape Recorder", vol. 12, No. 451 (P-791) (3298) Nov. 28, 1988 Yamamoto.

*Primary Examiner*—Andrew L. Sniezek
*Attorney, Agent, or Firm*—Robert W. Lahtinen; Richard E. Billion; Roy W. Truelson

[57] ABSTRACT

High density magnetic disk storage and semiconductor module technologies are combined to provide a disk drive using a standard multilayer ceramic substrate as the disk drive base support member to support spindle and actuator assemblies including 1 inch diameter disks. The ceramic substrate has components and very large scale integration (VLSI) chips mounted directly thereon to avoid use of one level of packaging and presents standard pins to mount the drive using standard sockets to afford economy and reliability.

17 Claims, 6 Drawing Sheets

MAGNETIC DISK STORAGE DEVICE WITH THE BASE PROVIDED BY AN ELECTRONIC MODULE SUBSTRATE

This is a continuation of prior application 07/746,044 filed Aug. 9, 1991 which is a continuation of application 07/409,495 filed Sep. 19, 1989, both of which are abandoned.

BACKGROUND

Disk drives for data storage originally had broad requirements with respect to size or power consumption. However, with the advent of the personal computer the defacto size or form factor for disk drives was established by the space provided in the equipment by the initial user and this tended to be the dimensions of the initial commercially successful product. Subsequent devices of higher performance or storage capability were required to occupy the same space to obtain commercial acceptance. As equipment became more compact, smaller disks and reduced form factors created progressively smaller standard sizes. This has progressed thru 5¼, 3½ and 2½ disk sizes.

Within the form factor dimensions it has been necessary to optimize the use of space. To increase the storage density the number of disks must be maximized to achieve the optimum number of data surfaces. The electronics consequently occupies the space not required for the head-disk assembly (HDA).

Originally a single circuit card was used to provide the most economical design. However, when the HDA consumed the entire vertical height of the form factor it was necessary to have electrical components occupy the available residual volumes. Such a design is shown in Ser. No. 305,226, filed Jan. 31, 1989 now U.S. Pat. No. 5,038,239 which uses multiple cards, components mounted on flexible cable and motor driven heat dissipation and isolation provided by using portions of the unit frame.

As devices became portable and utilized battery power, minimal system power consumption became an objective. Electronic circuity consumed little power, but any function involving illumination or the driving of mechanical parts became the object of power conservation to reduce battery size and weight and/or extend the period of battery operation without recharging or replacement.

SUMMARY

In the disk drive of the present invention the drive base is provided by an electronic module substrate that supports the disk spindle assembly and the transducer carrying actuator mechanism. The electronic circuitry for controlling drive functions is carried by the substrate and may be partially integrated into the multilayer substrate. A cover encloses the head-disk assembly.

A standard 36 mm square ceramic substrate for an electronic module carries a spindle motor on which a series of disks are mounted about the common axis. A transducer carrying actuator is also mounted on the substrate and includes a voice coil motor for moving the transducers respectively from one concentric track to another. Mounting some discrete components and the VLSI chips on the standard ceramic substrate by direct chip attach methods simplifies the electronic circuitry by eliminating one packaging level. This process which uses proven fabrication techniques, is also more economical and more reliable. The head-disk enclosure is mounted to a planar board in a standard socket to permit easy insertion and removal, particularly when such devices are used in clustered applications.

Using a disk of approximately 1 inch diameter, the head disk assembly is fabricated on a standard module substrate within a height of 15 mm exclusive of the connector pins extending from the assembly.

DETAILED DESCRIPTION

Figure 1:
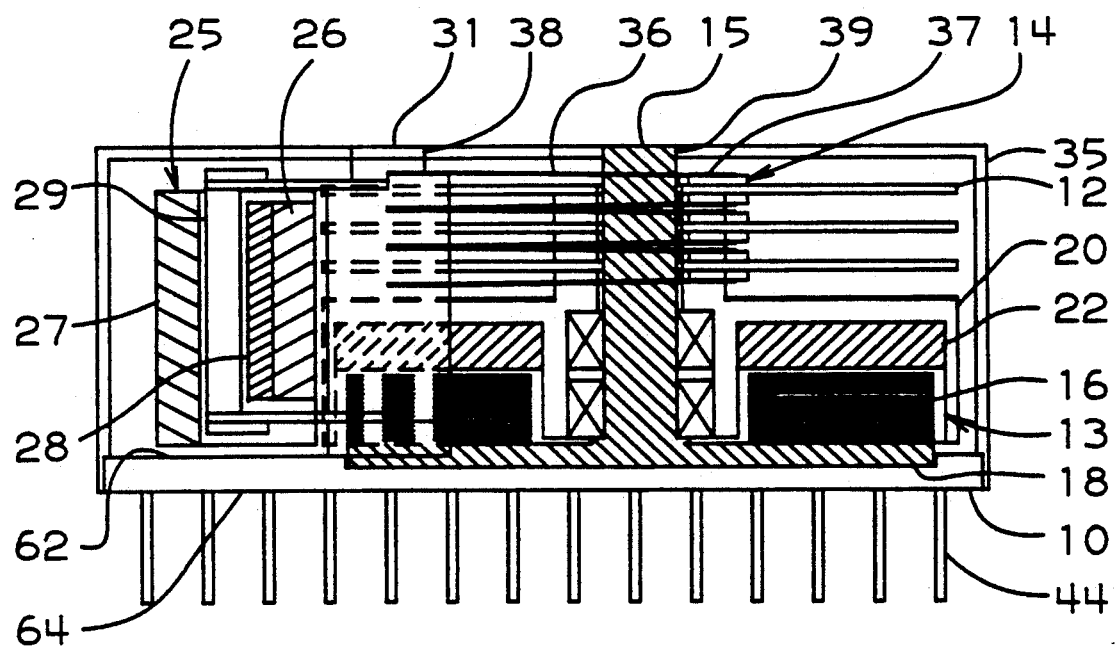
FIG. 1 is a side elevation, partly in section, showing the magnetic disk drive of the present invention.

Referring to FIG. 1, the magnetic disk drive of this invention uses a substrate such as a semiconductor substrate standard 36 mm by 36 mm multilayer ceramic (MLC) module substrate as the base 10. The base 10 includes an upper surface 62 and a lower surface 64. Both the electrical components and the mechanical components are mounted to this common base structure. The disk drive includes a plurality of data storage disks 12 which have a nominal diameter of 26 mm and a 0.381 mm thickness.

Figure 2:
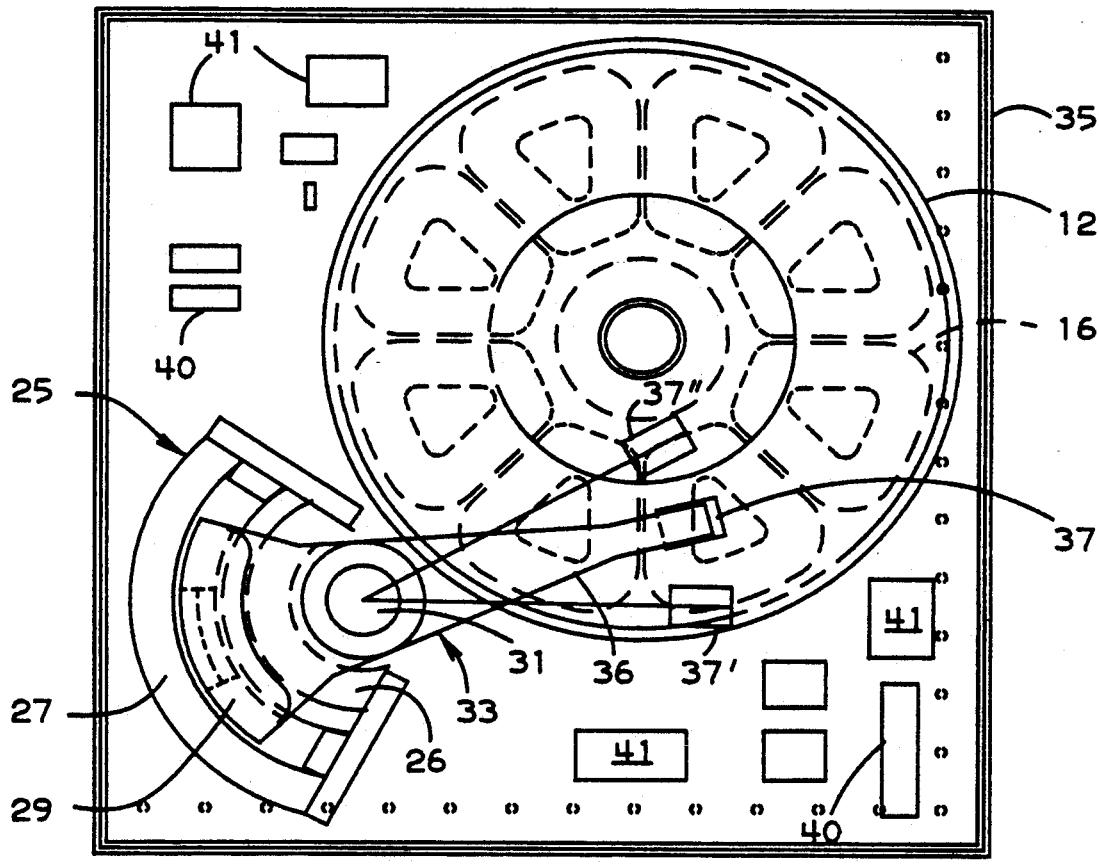
FIG. 2 is a plan view of the disk drive of FIG. 1 with portions of the spindle and voice coil motors shown in phantom view.

The disks are mounted on a spindle assembly 14 and driven by a flat coil pancake type DC brushless motor 13, which includes a spindle shaft 15, which is a dead shaft, that is secured to base 10. Spindle motor 13 includes flat coils 16, stationary core portion 18, a rotary core portion 20 which is a part of the spindle assembly 14 and a ring shaped permanent magnet 22 which rotates in unison with core portion 20. The shaft 15 and stationary core 18 are formed as a single part. Actuator 25 (FIGS. 1 and 2) is a rotary voice coil type using a fixed pole piece assembly including a magnetically permeable inner core 26, a magnetically permeable outer core 27 and two permanent magnets 28 which cooperate to form a working gap in which a voice coil 29 moves. The actuator shaft 31, which is a dead shaft, is fixed to base 10. The transducer support assembly 33 is mounted for rotation about shaft 31 and includes the arms that support the transducers 37 mounted at one side of the axis of rotation and voice coil 29 at the opposite side of the axis. The showing of transducer 37' illustrates the location of transducer 37 when moved by actuator 25 to the outermost data track and transducer 37" illustrates the location of transducer 37 when positioned at the innermost data track.

Figure 3:
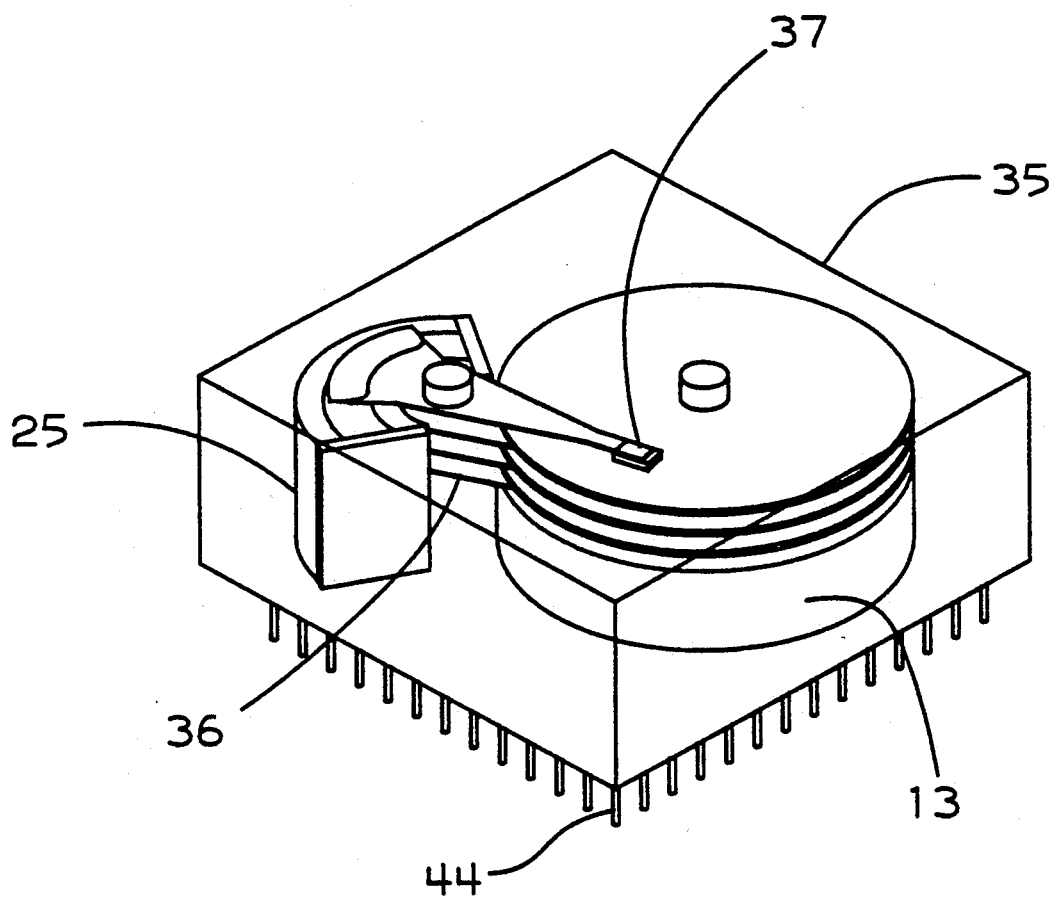
FIG. 3 is an isometric view of the disk drive of FIG. 1 showing the spindle and actuator assemblies within the enclosure.
Figure 5:
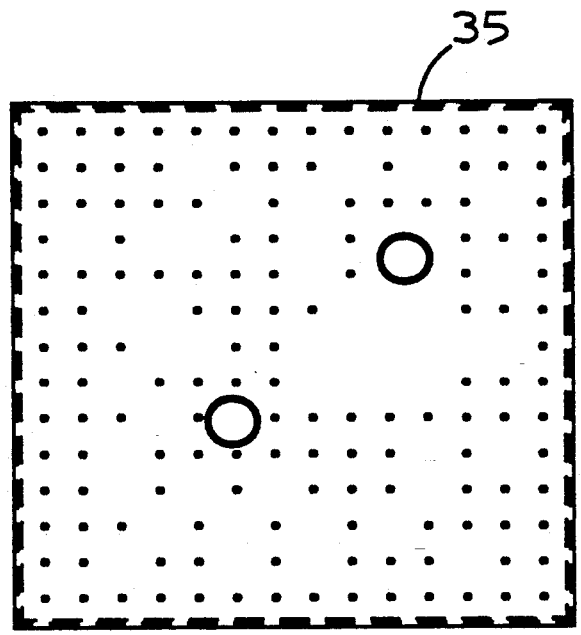
FIGS. 4, 5 and 6 are respectively the same views as FIGS. 1, 2 and 3 with the cover installed and some cover and base concealed portions shown in phantom view.
Figure 4:
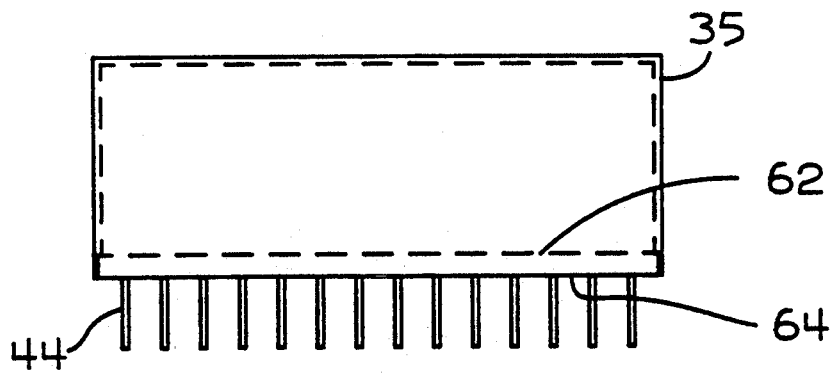
Figure 6:
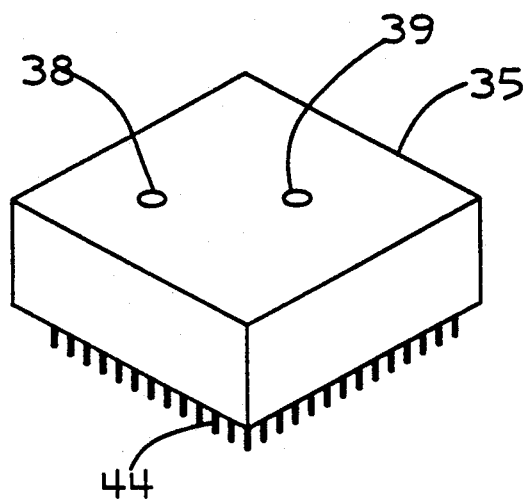

The base structure cooperates with a metal cap 35 which provides both a sealed enclosure surrounding the actuator and disk assemblies to isolate these components from contamination and apertures 38. 39 which surround and capture the tops of the spindle shaft 15 and actuator shaft 31 to afford double ended support for the shafts and continuing precision spacing therebetween. The disk drive module is shown in assembled form in FIG. 3.

Figure 7:
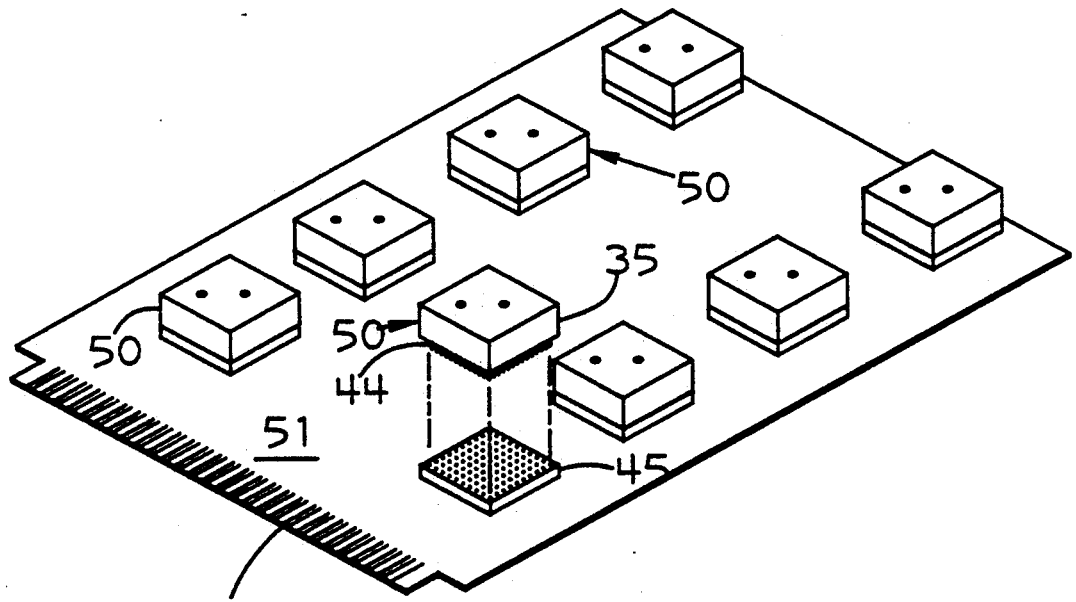
FIG. 7 shows a series of drives as shown in FIGS. 1-6 mounted on a planer board via sockets carried by the board.

The electronic functions for controlling the disk drive are preformed by components 40 and VLSI chips 41 mounted directly to the base structure. The multilayer ceramic base eliminates the need for first level packages for the very large scale integration (VLSI) chips, since such chips are directly attached to the device base using standard multi chip module fabrication techniques. Other electrical functions, including portions of the disk drive control circuitry, are integrated into the multilayer ceramic module substrate 10 that also functions as the base for supporting the drive assemblies. External connections for electrical signals between the disk drive and the using system are effected through the standard pins 44 associated with the ceramic substrate 10 which are received in sockets 45 (FIG. 7). The pins 44 extend from the lower surface 64 of the base 10.

FIG. 7 illustrates an environment wherein a series of eight disk drives 50 are mounted on a card or circuit board 51 which connects the clustered drives to the using system through the edge connector 52.

Figure 8:
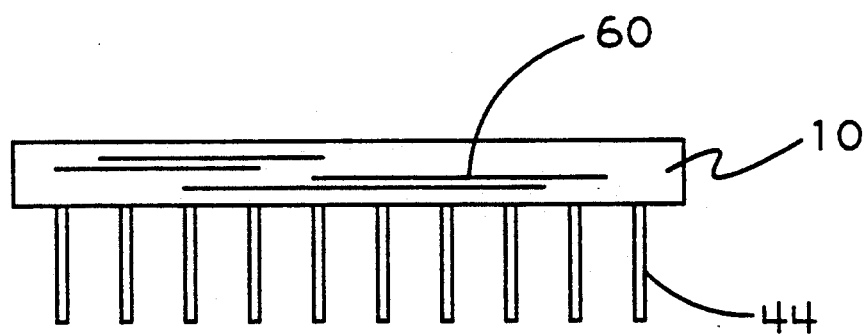
FIG. 8 shows a cross sectional view of a substrate showing wires representing the circuitry therein.

FIG. 8 shows a cross sectional view of a substrate or base 10 showing wires 60 representing circuitry for controlling drive functions of the disk drive.

While this invention has been particularly described with reference to a preferred embodiment thereof, it will be understood by those skilled in the art that various changes in detail may be made therein without departing from the spirit and scope of this invention.

What is claimed is:

1. A disk storage apparatus attached to a socket carried by a circuit board comprising
   a multilayer ceramic substrate having multiple chips mounted thereon and having upper and lower substantially parallel surfaces;
   electrical components mounted on the upper surface of said substrate controlling the disk storage apparatus;
   a plurality of pins secured at and extending from the lower surface of said substrate for connecting to said socket and for carrying signals to and from the disk storage apparatus;
   a first shaft having an attached end supported on said substrate and a free end;
   a second shaft having an attached end supported on said substrate and a free end, the attached ends of each of the first and second shafts attached and supported at the substrate upper surface;
   a disk spindle assembly rotatably attached to one of said first and second shafts;
   a transducer carrying actuator assembly rotatably attached to the other of said first and second shafts; and
   a plurality of conductive path layers within said multilayer substrate, each of said plurality of conductive path layers containing a plurality of electrically conductive paths, said conductive paths electrically connecting the electrical components on the substrate to the disk spindle assembly and the actuator assembly.

2. The disk storage apparatus of claim 1 further comprising a cover which cooperates with said substrate to surround and enclose said electrical components, said disk spindle assembly and said actuator assembly.

3. The disk storage apparatus of claim 2 wherein said cover includes means for engaging the free ends of both the first and second shafts.

4. The disk storage apparatus of claim 1 wherein the length and width dimensions and pin locations of said multilayer ceramic substrate are such that the disk storage apparatus forms a module which can be connected to a standard socket mounted on a circuit board.

5. The disk storage apparatus of claim 4 wherein the substrate is approximately 36 mm by 35 mm.

6. The disk storage apparatus of claim 5 wherein the disk spindle assembly includes at least one disk having a diameter of approximately one inch.

7. A magnetic storage apparatus comprising
   a multilayer module substrate having upper and lower surfaces;
   a disk spindle assembly mounted on said substrate;
   a transducer carrying actuator assembly mounted on said substrate; and
   control means for controlling the disk storage apparatus including at least one large scale integration (LSI) chip mounted on said substrate; said control means being operatively connected to said spindle assembly and said transducer assembly;
   said control means, said spindle assembly and said actuator assembly being mounted on the upper surface of said substrate, and;
   a plurality of conductive path layers within said multilayer substrate, each of said plurality of conductive path layers containing a plurality of electrically conductive paths, said conductive paths electrically connecting said control means, said spindle assembly, and said transducer assembly.

8. The magnetic disk storage apparatus of claim 7 wherein said substrate is a multilayer ceramic module substrate and said storage apparatus further comprises a cover mounted on said substrate and cooperating with said substrate to enclose said spindle assembly and said actuator assembly and substantially seal such assemblies from the surrounding environment.

9. The magnetic disk storage apparatus of claim 8 further comprising a series of pins secured to and extending from the lower surface of said substrate, said pins being connected to said disk storage apparatus to transfer data and command signals between said storage apparatus and a device connected to said pins.

10. The magnetic disk storage apparatus of claim 8 wherein said disk spindle assembly and said actuator assembly rotate about fixed shafts, each of said fixed shafts having a secured end and a distal end, with said secured end of each shaft attached to said multilayer ceramic substrate.

11. The magnetic disk storage apparatus of claim 10 wherein said cover is secured to the distal ends of the fixed shafts about which said disk spindle and actuator assemblies are rotated.

12. The magnetic disk storage apparatus of claim 8 wherein said substrate is a multilayer ceramic module substrate upon which very large scale integration (VLSI) chips are directly mounted.

13. A disk storage apparatus for mounting in a pin receiving socket member comprising
   a multilayer module substrate having upper and lower surfaces;
   a disk carrying spindle assembly mounted on said substrate upper surface;

a transducer carrying actuator assembly mounted on said substrate upper surface;

electrical components, including at least one large scale integration (LSI) ship directly attached to said multilayer module substrate at said upper surface;

a plurality of pins secured at and extending from said substrate lower surface and positioned in a pattern to be received by said socket member; and a plurality of conductive path layers within said multilayer substrate, each of said plurality of conductive path layers containing a plurality of electrically conductive paths, said conductive paths electrically connecting said electrical components to said spindle assembly and said actuator assembly.

14. The disk storage apparatus of claim 13 wherein said multilayer module substrate is a multilayer ceramic module substrate.

15. The disk storage apparatus of claim 14 further comprising a cover which cooperates with said substrate to surround and enclose said spindle and actuator assemblies and substantially seal the enclosed volume from the surrounding atmosphere.

16. The disk storage apparatus of claim 13 wherein said spindle assembly includes disks having a diameter of substantially one inch.

17. The disk storage apparatus of claim 16 wherein the length and width dimensions of such apparatus are substantially 36 millimeters.

* * * * *